(12) United States Patent
Arians et al.

(10) Patent No.: US 9,026,522 B2
(45) Date of Patent: May 5, 2015

(54) SEARCHABLE WEB WHOIS

(71) Applicants: Lambert Arians, Ashburn, VA (US);
Anirban Mukherjee, Karnataka (IN)

(72) Inventors: Lambert Arians, Ashburn, VA (US);
Anirban Mukherjee, Karnataka (IN)

(73) Assignee: Verisign, Inc., Reston, VA (US)

( * ) Notice: Subject to any disclaimer, the term of this patent is extended or adjusted under 35 U.S.C. 154(b) by 56 days.

(21) Appl. No.: 13/675,766

(22) Filed: Nov. 13, 2012

(65) Prior Publication Data

US 2014/0101194 A1   Apr. 10, 2014

(30) Foreign Application Priority Data

Oct. 9, 2012   (IN) .................... F25/1984/2012/CHE

(51) Int. Cl.
*G06F 17/00* (2006.01)
*G06F 17/30* (2006.01)
*G06Q 10/08* (2012.01)

(52) U.S. Cl.
CPC .......... *G06F 17/30867* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 5,706,365 A | 1/1998 | Rangarajan et al. | |
| 6,125,395 A | 9/2000 | Rosenberg et al. | |
| 6,895,430 B1 | 5/2005 | Schneider | |
| 6,901,436 B1 | 5/2005 | Schneider | |
| 6,973,505 B1 | 12/2005 | Schneider | |
| 7,188,138 B1 | 3/2007 | Schneider | |
| 7,194,552 B1 | 3/2007 | Schneider | |
| 7,287,042 B1 * | 10/2007 | Jassy et al. ............................. 1/1 |
| 7,493,400 B2 * | 2/2009 | Loaiza et al. ................. 709/227 |
| 7,523,181 B2 * | 4/2009 | Swildens et al. .............. 709/223 |
| 7,565,402 B2 | 7/2009 | Schneider | |
| 7,664,831 B2 | 2/2010 | Cartmell et al. | |
| 7,890,602 B1 | 2/2011 | Parsons et al. | |
| 7,904,445 B2 | 3/2011 | Adelman et al. | |
| 7,930,400 B1 * | 4/2011 | Fox et al. ...................... 709/226 |
| 7,962,438 B2 | 6/2011 | Adelman et al. | |
| 8,036,224 B2 | 10/2011 | Axelsson et al. | |
| 8,037,168 B2 | 10/2011 | Schneider | |
| 8,069,187 B2 | 11/2011 | Adelman et al. | |

(Continued)

FOREIGN PATENT DOCUMENTS

| EP | 2006781 A1 | 12/2008 |
|---|---|---|
| WO | 9909726 A1 | 2/1999 |
| WO | 2004040466 A1 | 5/2004 |

OTHER PUBLICATIONS

Mark Goldstein, Who Was, WhoIs and Who Will Be: Domain Name Ownership Research Tools, Online Magazine, vol. 27 No. 3, May/Jun. 2003, 6 pages.

(Continued)

*Primary Examiner* — Hung Le
(74) *Attorney, Agent, or Firm* — MH2 Technology Law Group, LLP

(57) ABSTRACT

Systems and methods for searching domain names and owner information associated with the domain names in a web-based WhoIs search tool. Systems including one or more databases and one or more text indexes may store data including the domain names and owner information, and index text-searchable portions of the data. A search request may be received from a user with user preferences such as a selection of multiple or all top level domains. Search results may be ranked by relevancy, and may include the domain name with associated owner information.

14 Claims, 19 Drawing Sheets

(56) References Cited

U.S. PATENT DOCUMENTS

| | | | |
|---|---|---|---|
| 8,156,227 B2* | 4/2012 | Fox et al. | 709/226 |
| 8,224,994 B1* | 7/2012 | Schneider | 709/245 |
| RE43,690 E | 9/2012 | Schneider et al. | |
| RE44,207 E | 5/2013 | Schneider | |
| 8,458,161 B2 | 6/2013 | Schneider | |
| 8,612,565 B2 | 12/2013 | Schneider | |
| 8,635,340 B1 | 1/2014 | Schneider | |
| 2002/0078045 A1 | 6/2002 | Dutta | |
| 2003/0149690 A1* | 8/2003 | Kudlacik et al. | 707/3 |
| 2004/0220903 A1 | 11/2004 | Shah et al. | |
| 2005/0210149 A1 | 9/2005 | Kimball | |
| 2005/0216288 A1 | 9/2005 | Parsons | |
| 2006/0026147 A1 | 2/2006 | Cone et al. | |
| 2008/0016233 A1 | 1/2008 | Schneider | |
| 2008/0059607 A1 | 3/2008 | Schneider | |
| 2008/0320015 A1 | 12/2008 | Mahdavi | |
| 2009/0210417 A1 | 8/2009 | Bennett | |
| 2009/0254545 A1 | 10/2009 | Fisken | |
| 2010/0106731 A1 | 4/2010 | Cartmell et al. | |
| 2010/0299409 A1* | 11/2010 | Cartmell et al. | 709/219 |
| 2010/0299410 A1* | 11/2010 | Cartmell et al. | 709/219 |
| 2011/0087769 A1 | 4/2011 | Holmes et al. | |
| 2011/0252059 A1* | 10/2011 | Schneider | 707/770 |
| 2011/0258237 A1* | 10/2011 | Thomas | 707/803 |
| 2012/0084281 A1 | 4/2012 | Colosi | |

OTHER PUBLICATIONS

J. Gargano et aL, "Whois and Network Information Lookup Service Whois++", RFC 1834 Informational, http://www.ietf.org/rfc/rfc1834.txt, Aug. 1995, pp. 1-8.

Gonzalo Navarro et al., "Modern Information Retrieval, Chapter 8: Indexing and Searching", Modern Information Retrieval, Jan. 1, 1999, pp. 191-228.

Author Unknown, "Whois", from Wikipedia, the free encyclopedia, http://www.en.wikipedia.org/wiki/whois, Retrieved on Feb. 9, 2007, pp. 1-6.

Extended European Search Report issued Apr. 11, 2014, European Application No. 13189847.0 filed Oct. 23, 2013, pp. 1-6.

* cited by examiner

| 500 | 580 United States ⌄ |
| --- | --- |
| | 560 Welcome Bert Arians, VIS \| Sign Out |

| Domains | Searchable WhoIs |
| --- | --- |
| .com WhoIs | |
| .net WhoIs | 512    510 |
| .gov WhoIs | [All Domains ▼] [Andy]   [Search]   [Chat With Support] |
| .tv WhoIs | ● Domain  ○ Registrar  ○ Contacts  ○ Name Server   Advanced Search |
| .cc WhoIs | |
| .jobs WhoIs | ANDY.COM                                           514     [Security] |
| .name WhoIs | Network Solutions, LLC., Whois Server |
| Searchable WhoIs | NSc1.IPOWERDNS.COM; NS1.IPOWERWEB.NET |
| | clientTransferProhibited |
| | Updated Date: 24-jun-2011, Creation Date: 28-jun-1994, Expiration Date: 27-jun-2016 |

550

ANDY.NET
GoDaddy.com, Inc., Whois Server
NS1.RMCCOLO.NET, NS2.ANDY.NET, NS2.RMCCOLO.NET
clientDeleteProhibited, clientRenewProhibited, clientTransferProhibited,  — 540
clientUpdateProhibited
Updated Date: 01-jul-2012, Creation Date: 27-jan-1995, Expiration Date: 28-jan-2020

ANDY.TV
Name.com, Inc., Whois Server
SERVER1.INSTEALTHMODE.COM, SERVER2.INSTEALTHMODE.COM
clientTransferProhibited
Updated Date: 19-mar-2011, Creation Date: 18-mar-2010, Expiration Date: 18-mar-2012

520 —

ANDY.CC
Key-Systems GMBH., Whois Server
NS3.DOMAINNAME.AT, NS4.DOMAINNAME.AT
Active
Updated Date: 20-jan-2011, Creation Date: 08-jan-2003, Expiration Date: 09-jan-2012

ANDY21.COM
Network Solutions, LLC., Whois Server
NSc1.IPOWERDNS.COM; NS1.IPOWERWEB.NET
clientTransferProhibited
Updated Date: 24-jun-2011, Creation Date: 28-jun-1994, Expiration Date: 27-jun-2016

CANDY.COM
Network Solutions, LLC., Whois Server
NSc1.IPOWERDNS.COM; NS1.IPOWERWEB.NET
clientTransferProhibited
Updated Date: 24-jun-2011, Creation Date: 28-jun-1994, Expiration Date: 27-jun-2016

RANDY.NET
GoDaddy.com, Inc., Whois Server
NS1.RMCCOLO.NET, NS2.ANDY.NET, NS2.RMCCOLO.NET
clientDeleteProhibited, clientRenewProhibited, clientTransferProhibited,
clientUpdateProhibited
Updated Date: 01-jul-2012, Creation Date: 27-jan-1995, Expiration Date: 28-jan-2020

Fig. 5A

520 —
RANDY.CC
Key-Systems GMBH., Whois Server
NS3.DOMAINNAME.AT, NS4.DOMAINNAME.AT
Active
Updated Date: 20-jan-2011, Creation Date: 08-jan-2003, Expiration Date: 09-jan-2012

SANDY.CC
Key-Systems GMBH., Whois Server
NS3.DOMAINNAME.AT, NS4.DOMAINNAME.AT
Active
Updated Date: 20-jan-2011, Creation Date: 08-jan-2003, Expiration Date: 09-jan-2012

BRANDY.TV
Name.com, Inc., Whois Server
SERVER1.INSTEALTHMODE.COM, SERVER2.INSTEALTHMODE.COM
clientTransferProhibited
Updated Date: 19-mar-2011, Creation Date: 18-mar-2010, Expiration Date: 18-mar-2012

1 2 3 4    Next
530

| SUGGESTIONS |

What you're looking for taken? Try one of these available Name Suggestions.

570    ANDY123.COM

ANDYGLOBAL.NET

ANDYMUSIC.TV

Find a Registrar Now!

Fig. 5B

| verisign | 510 | 🔍 Search |

⦿ Domain  ◯ Registrar  ◯ Nameserver    514

VERISIGN.CC
Tucows Inc.
A4.NSTLD.COM G4.NSTLD.COM L4.NSTLD.COM F4.NSTLD.COM
client-update-prohibited client-xfer-prohibited           — 540
Expiration: 18-Jun-2012 Updated: 03-Oct-2011 Created: 18-Jun-2003

VERISIGN.TV
eNom, Inc.
J4.NSTLD.COM K4.NSTLD.COM A4.NSTLD.COM H4.NSTLD.COM L4.NSTLD.COM G4.NSTLD.COM F4.NSTLD.COM
client-xfer-prohibited
Expiration: 17-Oct-2014 Updated: 03-Oct-2011 Created: 17-Oct-2004

VERISIGN.JOBS
Encirca, Inc.
L4.NSTLD.COM F4.NSTLD.COM G4.NSTLD.COM A4.NSTLD.COM
client-xfer-prohibited
520
Expiration: 04-Oct-2011 Updated: 03-Oct-2011 Created: 04-Oct-2005

VERISIGNINC.TV
Network Solutions, LLC.
A4.NSTLD.COM L4.NSTLD.COM G4.NSTLD.COM F4.NSTLD.COM
client-xfer-prohibited
Expiration: 16-Aug-2011 Updated: 03-Oct-2011 Created: 16-Aug-2010

VERISIGNINC.CC
Network Solutions, LLC.
A4.NSTLD.COM G4.NSTLD.COM L4.NSTLD.COM F4.NSTLD.COM
client-xfer-prohibited
Expiration: 05-Nov-2011 Updated: 03-Oct-2011 Created: 05-Nov-2010

[ MORE ]

Fig. 7B

```
google                                    [🔍 Search]
● Domain   ○ Registrar   ○ Nameserver GOOGLE.CC
MarkMonitor Inc.
NS2.GOOGLE.COM NS4.GOOGLE.COM NS3.GOOGLE.COM NS1.GOOGLE.COM
client-delete-prohibited client-update-prohibited client-xfer-prohibited
Expiration: 07-Jun-2011 Updated: 03-Oct-2011 Created: 07-Jun-1999

GOOGLE.TV
eNom, Inc.
NS1.GOOGLE.COM NS3.GOOGLE.COM NS2.GOOGLE.COM
client-delete-prohibited client-xfer-prohibited
Expiration: 02-Aug-2011 Updated: 03-Oct-2011 Created: 02-Aug-2002

GOOGLE.JOBS
MarkMonitor Inc.
NS2.GOOGLE.COM NS1.GOOGLE.COM
client-delete-prohibited client-update-prohibited client-xfer-prohibited
Expiration: 15-Sep-2011 Updated: 03-Oct-2011 Created: 15-Sep-2005

710 GOOGLER.TV
Wild West Domains, Inc.
NS1.IPRESOURCES.COM NS2.IPRESOURCES.COM
client-delete-prohibited client-renew-prohibited client-update-prohibited client-xfer-prohibited
Expiration: 14-Mar-2012 Updated: 03-Oct-2011 Created: 14-Mar-2006

720 IGOOGLE.TV
GoDaddy.com, Inc.
NS17.SERVERQUALITY.COM NS18.SERVERQUALITY.COM
client-delete-prohibited client-renew-prohibited client-update-prohibited client-xfer-prohibited
Expiration: 10-Jan-2012 Updated: 03-Oct-2011 Created: 10-Jan-2007

[ MORE ]
```

Fig. 7C

TOMé.TV                                            🔍 Search

● Domain   ○ Registrar   ○ Nameserver

TOMé.TV
Name.com LLC
NS1.NAME.COM NS4.NAME.COM NS3.NAME.COM NS2.NAME.COM
client-xfer-prohibited
Expiration: 02-Dec-2011 Updated: 03-Oct-2011 Created: 02-Dec-2010

SAOTOMé.TV
PSI-USA, Inc. dba Domain Robot
NSB.DOMDOO.NET NSA.DOMDOO.NET
client-xfer-prohibited
Expiration: 11-Mar-2012 Updated: 03-Oct-2011 Created: 11-Mar-2008

Fig. 7D

```
tom                                                    🔍 Search
```
● Domain   ○ Registrar   ○ Nameserver TOM.TV
eNom, Inc.
NS2.EMAIL.COM.CN NS.EMAIL.COM.CN
client-xfer-prohibited
Expiration: 01-Jun-2012 Updated: 03-Oct-2011 Created: 01-Jun-2000

740 TOM.CC
GoDaddy.com, Inc.
PDNS02.DOMAINCONTROL.COM PDNS01.DOMAINCONTROL.COM
client-renew-prohibited client-update-prohibited client-delete-prohibited client-xfer-prohibited
Expiration: 09-Mar-2013 Updated: 03-Oct-2011 Created: 09-Mar-1998

730 TOMTOM.CC
GMO Internet, Inc. dba Onamas.com
NS1.DNS.NE.JP NS2.DNS.NE.JP
active
Expiration: 24-Apr-2011 Updated: 03-Oct-2011 Created: 24-Apr-2007

TOMTOM.TV
Name.com LLC
NS3.NAME.COM NS1.NAME.COM NS4.NAME.COM NS2.NAME.COM
client-xfer-prohibited
Expiration: 10-Mar-2012 Updated: 03-Oct-2011 Created: 10-Mar-2010

750 ATOM.TV
eNom, Inc.
NS93.CIRTEXHOSTING.COM NS94.CIRTEXHOSTING.COM
active
Expiration: 08-Aug-2011 Updated: 03-Oct-2011 Created: 08-Aug-2000

[ MORE ]

Fig. 7E

```
┌─────────────────────────────────────────────────────────────────┐
│  ┌──────────────────────────────────────────┐  ┌─────────────┐ │
│  │ elizabethhunt.jobs                       │  │ 🔍 Search   │ │
│  └──────────────────────────────────────────┘  └─────────────┘ │
│  ⦿ Domain   ○ Registrar   ○ Nameserver                         │
│                                                                 │
│  ELIZABETHHUNT.JOBS                                             │
│  Key-Systems GmbH                                               │
│  NS3-EU.123NS.EU NS4-EU.123NS.DE NS2-EU.123NS.DE NS1-EU.123NS.EU│
│  active                                                         │
│  Expiration: 15 Sep 2012 Updated: 03 Oct 2011 Created: 15 Sep 2005
│    Contacts   ┌──────────────────────────────────────────────┐770
│  760 Registrant│ Organization XLR123456789                   │  │
│           ⎨   │ Key Group Plc                                │  │
│               │ management@keygrplc.com Phone: +11.23456789 Fax: +11.23456788
│               │ active                                       │  │
│               └──────────────────────────────────────────────┘  │
│                                                                 │
└─────────────────────────────────────────────────────────────────┘
```

Fig. 7F

| elizabethhunt.jobs | 🔍 Search |

● Domain

ELIZABET
Key-Systen
NS3-EU.12
active
Expiration:
780 Contacts
Registrant

BILLING                                                                 790
KSIT Hostmaster
X-123456
Key-Systems Informationstechnologie Plc
hostmaster@key-systems.de Phone: +44.2123468956 Fax: +44.4576234599
active TECHNICAL
KSIT Hostmaster
X-123456
Key-Systems Informationstechnologie Plc
hostmaster@key-systems.de Phone: +44.6725698832 Fax: +44.1234567890
active ADMIN
John Smith
L678900055
Adec IT Services
admin.domain@adec.com Phone: +66.6256863512 Fax: +66.1234578877
active

Fig. 7G

```
          ┌─ 800
          │
┌─────────────────────────────────────────┐  ┌──────────┐
│ network AND solutions                   │  │ Q Search │
└─────────────────────────────────────────┘  └──────────┘
  ⦿ Domain   ○ Registrar   ○ Nameserver
```

810 NETWORKSSOLUTIONS.CC
Network Solutions, LLC.
NS2.NETSOL.COM NS1.NETSOL.COM NS3.NETSOL.COM
client-xfer-prohibited
Expiration: 08-Jul-2011 Updated: 03-Oct-2011 Created: 08-Jul-2004

NETWORKSOLUTIONS.TV
Network Solutions, LLC.
NS1.WORLDNIC.COM NS2.WORLDNIC.COM
client-xfer-prohibited client-delete-prohibited
Expiration: 01-Nov-2011 Updated: 03-Oct-2011 Created: 01-Nov-2002

820 NETWORK-SOLUTIONS.TV
Network Solutions, LLC.
NS67.WORLDNIC.COM NS68.WORLDNIC.COM
client-xfer-prohibited
Expiration: 08-Jul-2011 Updated: 03-Oct-2011 Created: 08-Ju-2004

NETWORKSSOLUTIONS.TV
Network Solutions, LLC.
NS2.NETSOL.COM NS1.NETSOL.COM NS3.NETSOL.COM
client-xfer-prohibited
Expiration: 08-Jul-2011 Updated: 03-Oct-2011 Created: 08-Jul-2004

NETWORKSOLUTIONS.CC
GoDaddy.com, Inc.
NS02.CASHPARKING.COM NS01.CASHPARKING.COM
client-update-prohibited client-renew-prohibited client-xfer-prohibited client-delete-prohibited
Expiration: 08-Apr-2011 Updated: 03-Oct-2011 Created: 08-Apr-2005

```
                                              ┌────────┐
                                              │  MORE  │
                                              └────────┘
```

Fig. 7H

| network solutions | 🔍 Search |

○ Domain  ● Registrar  ○ Nameserver  514

Network Solutions, LLC.
Network Solutions, LLC Herndon Virginia 20171 US
Phone: (703)668-4600 Fax: (703)668-7822 rgyxfr@networksolutions.com
Whois
Contacts

Network Solutions (direct dummy)
123 Main St. Dulles VA 20166 US
Phone: 555-555-5555 Fax: 555-555-5555 info@verisign-grs.com
Whois
Contacts

Interactive Telecom Network, Inc.
7007 Wind
Phone: 30  | TECHNICAL Jon Lewis jlewis@noof.com Phone: 123-444-0452 Fax:303-424-0874
Whois      | TECHNICAL James Vung jvung@ninc.net Phone: 978 601 4476 ext 3210 Fax:868 201 3672
520 Contacts | BILLING Jessica Eames jeames@noof.com Phone: 383-786-8700 Ext. 107 Fax:303-938-8388
Datasour   | ADMIN Larry Hartford lhartford@noof.com Phone: 313-494-0242 Fax:312-465-0734
L.9. 100 W
Phone: 612-000-0001 Fax: 612-000-0001 info@verisign-grs.com
Whois
Contacts

Network Savior, Inc.
DirectPlex, Mogra Village Mumbai Maharashtra 400069 IN
Phone: +1 832 295 1535 ext. 8501 Fax: +1 320 210 5146 accounts@logicboxes.com
Whois
Contacts

[ MORE ]

Fig. 7I

```
┌─────────────────────────────────────────────────────────────────┐
│  ┌──────────────────────────────────────────┐  ┌─────────────┐  │
│  │ godaddy.com                              │  │ 🔍 Search   │  │
│  └──────────────────────────────────────────┘  └─────────────┘  │
│  ○ Domain   ● Registrar   ○ Nameserver                          │
│                                                                 │
│  GoDaddy.com, Inc.                                              │
│  14455 N Hayden Suite 226 Scottsdale AZ 85260 US                │
│  Phone: 480 505 8800 Fax: 4880 505 8865 registrar_routine@godaddy.com │
│  Whois                                                          │
│  Contacts                                                       │
│                                                                 │
│                                                                 │
└─────────────────────────────────────────────────────────────────┘
```

Fig. 7J

| enom |
| O Domain | enom, Inc
158801 NE
Phone: 42
Whois
830 Contacts
780

Enom Co
15801 NE
Phone: 1
Whois
Contacts eNom We
15801 NE
Phone: 42
Whois
Contacts TECHNICAL: John Guley john.guley@enom.com Phone: 425-234-4556 ext 4894 Fax:undefined
TECHNICAL: Bob Anderson bob.anderson@enom.com Phone: 425-274-4500 ext 4267 Fax:undefined
TECHNICAL: Adam Larsen adam.larsen@enom.com Phone: 4252744500 ext 4312 Fax:undefined
ADMIN: Max Ravelle max.ravelle@enom.com Phone: 425-274-4500 ext 4226 Fax:undefined
TECHNICAL: Jim Jomeier jim.jomeier@enom.com Phone: 919-341-2454 Fax:undefined
ADMIN: Billy Wagh billy.wagh@enom.com Phone: 425-274-4500 ext 4763 Fax:undefined
TECHNICAL: Katie Car KATIE.CAR@DEMANDMEDIA.COM Phone: 425-274-4340 EXT 4123 Fax:425-974-4796
TECHNICAL: Paul Mer paul.mer@enom.com Phone: 425-274-4500 ext 4121 Fax:undefined
LEGAL: Clark Cleveland clark.cleveland@enom.com Phone: 425-274-4120 ext 4125 Fax:undefined
LEGAL: Kevin Clup kevin.clup@enom.com Phone: 425-274-4120 ext 4124 Fax:undefined
ADMIN: Lydia Epstein lydia.epstein@demandmedia.com Phone: 425-124-4437 Fax:+1-425-965-4703
ADMIN: Jeffrey Ecks ecks@enom.com Phone: 425-274-4167 Fax:+1-425-974-4233
LEGAL: Erich Haz erich.haz@enom.com Phone: 425-874-4500 ext 4870 Fax:undefined
LEGAL: Carol Michael carol.michael@enom.com Phone: 425-274-4345 ext 4298 Fax:undefined

790

Enom GMP Services Inc
2002 156th Ave. NE Suite 300 Bellevue WA 98008 US
Phone: 425-274-4500 Fax: 425-974-4795 nsiregistry@enom.com
Whois
Contacts

Fig. 7K

| g4.nstld.com | 🔍 Search |

○ Domain   ○ Registrar   ● Nameserver   514

G4.NSTLD.COM
Tucows Inc. CC
active

G4.NSTLD.COM
DIRECTNIC, LTD TV
active

G4.NSTLD.COM
Encirca, Inc JOBS
active

Fig. 7L

| 192.41.162.32 | 🔍 Search |

○ Domain  ○ Registrar  ● Nameserver

L3.NSTLD.COM
Verisign, Inc. CC
192.41.162.32
server-update-prohibited server-delete-prohibited client-update-prohibited client-delete-prohibited L3.NSTLD.COM
Verisign, Inc. TV
192.41.162.32
server-update-prohibited server-delete-prohibited client-update-prohibited client-delete-prohibited L3.NSTLD.COM
Verisign, Inc. JOBS
192.41.162.32
server-update-prohibited server-delete-prohibited client-update-prohibited client-delete-prohibited

Fig. 7M

SEARCHABLE WEB WHOIS

This application claims the benefit of Indian Patent Application No. F25/1984/2012/CHE, filed Oct. 9, 2012, which is incorporated herein by reference in its entirety.

TECHNICAL FIELD

The techniques described herein relate generally to providing search tools to users for searching domain names and owner information associated with the domain names.

BACKGROUND

There are multiple services available for searching registered and unregistered domain names. Among these services is a protocol called "WhoIs," that has existed since the formation of the Internet. The WhoIs protocol queries databases for owner information associated with the registrant or assignee information of registered Internet domain names in a top level domain (TLD). Initially, the Internet contained only a few TLDs such as .com, .net, and .org. As the Internet has expanded, however, many new TLDs have been added, including .gov, .edu, .cc, .tv, .jobs, and many others. TLDs are organized into registries, such as a registry containing the .com and .net, TLDs, and another registry containing the .cc, .tv, and .jobs TLDs. These registries are used by WhoIs search services and utilities.

Current WhoIs searching services, however, are substantially restricted. For example, current services only search a single registry per search request. One reason for this restriction is that information from multiple registries is not traditionally accessible in combination. Registry data file sizes are also restrictive. Some registries contain an extremely large amount of data, and current WhoIs search techniques would take too long to index and search the data of multiple registries. The .com/.net registry alone, among the largest of the domain name registries, contains over 120 million domains, and this results in over 700 million entities in the registry database, comprising domains, nameservers, and their associated attributes and relationships, which must be processed and indexed for searching. Furthermore, changes such as additions or deletions to the registries are made constantly due to the dynamic nature of the Internet, to keep registry databases current. Such modifications must also be indexed in near real-time to keep search results accurate and up-to-date. Full re-indexing is periodically required due to corruptions, failures, design changes, deployment changes and unforeseen scenarios. As such, full indexing must be attainable within a few hours in order to be able to catch up with the incremental changes that get accumulated while the full indexing is completed. This helps maintain the search utility's accuracy and efficiency. Due to the sheer volume of data processing and indexing required to manage even a single registry, and the highly dynamic nature of the domain name data, searching across multiple registries simultaneously using current indexing methods is not practical.

Generally, indexing is utilized for documents which are more static in nature, and longer periods of time are allowed to fully index the information or updates. In traditional indexing methods, content is extracted from documents, tokenized into words based primarily on whitespace recognition, stop words are removed, and stemming is sometimes carried out before data is added to the index. Matching arbitrary substrings within terms is typically not of much importance. Search results are ordered by decreasing relevance scores based on term frequency (occurrences of the term in the document) and inverse document frequency (rarity of the term) across the set of documents being searched. Indexing such large quantities of data is difficult when the data is updated almost continuously. These traditional methods are not practical for indexing domain names.

In contrast to documents, domain names are sets of concatenated words and numbers, sometimes, but only relatively rarely, delimited by dashes. As such, indexing domain names is more complex than mere whitespace recognition performed in document indexing. Recognition of the separate words in domain names usually requires tokenization. However, tokenization of every domain name into words for indexing is based on computation-intensive dynamic programming algorithms combined with statistical techniques. This is prone to a certain degree of inaccuracy partly because it is based on probabilistic techniques, and partly because of the inherent ambiguity present in human languages. Tokenization success depends on the use of large language corpuses. This method of indexing domain name data may take several days for the com/net registry alone, unless heavily parallelized across many computers. Even then, tokenization may actually end up decreasing the accuracy of arbitrary substring searches.

Furthermore, domain names are short compared to documents like web pages or word processing files. A meaningful text search for domain names must be able to support arbitrary substring matches. But, results would require ordering by relevance in a useful search utility. Unlike document searches, term frequency and inverse document frequency are less useful relevance indicators in domain name searching, because many domain names would typically only have one or no occurrences of a given search term.

As a result of the restrictions discussed above, current WhoIs services offer few interactive search features for users. Search capabilities are less comprehensive due in part to the lack of interactive search features. Traditional search utilities only search for domain names that exactly match the search query, such as a search for "tom" returning "tom.com," or "no results." Normally, results to WhoIs searches show general substring matches, leading only matches, or hypen-separated regex matches. Wildcard searches denoted by "*" such as "*tom" may return additional results such as "atom.com," but the results are not listed in any order of relevancy or ranked by TLD.

In view of the above, a better way is needed to index domain names to support a more usable WhoIs searching utility that can search multiple TLD registries simultaneously. A unified interactive interface can be a powerful adjunct that will allow focused searches as well as cross-registry visibility.

The disclosed embodiments are directed to overcoming one or more of the problems set forth above, and to providing improved WhoIs search techniques.

BRIEF SUMMARY

In one disclosed embodiment, a computer-implemented WhoIs search method is performed. The method includes receiving and storing domain names and owner information at one or more networked databases. The method further includes indexing suffixes of the domain names and of text-searchable portions of owner information, and storing the suffixes in one or more text indexes. The method further includes receiving a search request and one or more search preferences from a user, searching the text index in response to the search request, and receiving search results including at least one matched domain name. The method further includes querying the database for owner information corresponding to the at least one matched domain name, and displaying the at least one matched domain name and corresponding owner information to the user.

In another disclosed embodiment, a WhoIs searching system is provided. The system includes one or more networked databases, one or more indexer modules, one or more text indexes, a web client module, and a web server. The one or more networked databases are configured to receive and store domain names and owner information. The one or more indexer modules are configured to index suffixes of the domain names and text-searchable portions of the owner information stored in the database. The one or more text indexes are configured to receive and store suffixes indexed by the one or more indexer modules. The a web client module is configured to receive a search request and one or more search preferences from a user. The a web server is configured to forward the search request to the one or more text indexes, receive search results from the one or more text indexes, query the one or more databases for owner information corresponding to the search results, and forward the search results with the corresponding owner information to the web client. The web client displays the search results and corresponding owner information. The system modules are executed by one or more processors.

In another disclosed embodiment, a non-transitory computer readable storage medium is provided, having stored thereon instructions which when executed cause one or more computers to perform a WhoIs search method. The method further includes indexing suffixes of the domain names and of text-searchable portions of owner information, and storing the suffixes in one or more text indexes. The method further includes receiving a search request and one or more search preferences from a user, searching the text index in response to the search request, and receiving search results including at least one matched domain name. The method further includes querying the database for owner information corresponding to the at least one matched domain name, and displaying the at least one matched domain name and corresponding owner information to the user.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the techniques, as described herein, and together with the description, serve to explain the principles of the techniques. In the drawings:

FIGS. 5A and 5B illustrates an example of a user interface of certain embodiments of the system and method;

FIGS. 7A-7M are examples of certain features of embodiments of the system and method.

DETAILED DESCRIPTION

Described below are techniques for providing search tools to users for searching domain name data. Certain embodiments of the techniques described herein may enable a user to access databases having domain names, and owner information associated with the domain names. In some embodiments, the owner information may include contact information, registrar information, nameserver information, and any other pertinent owner information associated with the domain name.

Embodiments of the disclosed techniques may provide a variety of benefits and features such as, for example, improved user experience, increased search functionality, and improved quality in search results, among many other benefits. Moreover, the use of a suffix-based indexing scheme in accordance with embodiments of the techniques disclosed herein facilitates faster and more powerful searching through multiple larger domain name databases.

Reference will now be made to accompanying figures. Wherever possible, the same reference numbers will be used throughout the figures and the following description to refer to the same or similar parts. While several embodiments and features of the techniques are described herein, modifications, adaptations, and other implementations are possible, without departing from the spirit and scope of the techniques. For example, substitutions, additions or modifications may be made to the components illustrated in the figures, and the methods described herein may be modified by substituting, reordering, or adding steps to the disclosed methods. Accordingly, the following detailed description is not intended to limit the techniques to any specific embodiments or examples.

Overall System Architecture and Method Processes

Figure 1:
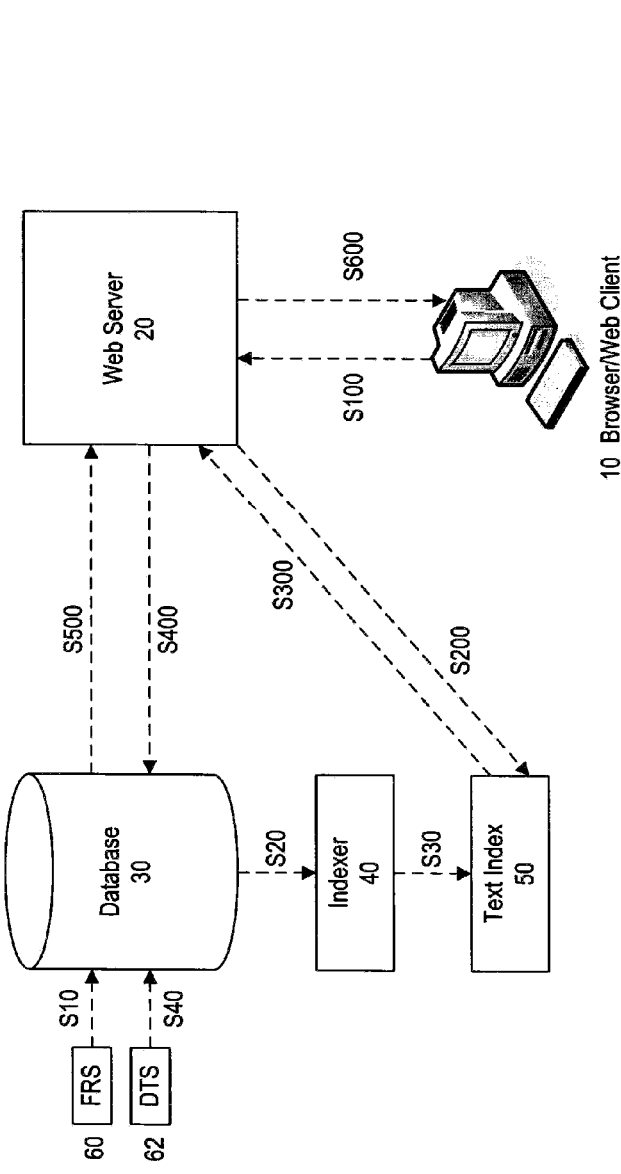
FIG. 1 is a diagram illustrating the basic scheme of certain embodiments of the system and method.

FIG. 1 is a diagram illustrating the basic scheme of a system and method of certain embodiments of the invention. As shown in FIG. 1, some embodiments of the invention may have components including a browser/web client 10, input/output (I/O) devices (not shown) for allowing a user to interact with the browser/web client, a web server 20, at least one database 30, at least one indexer 40, and at least one text index 50. The system components may be implemented in various ways. Each of the components may be embodied as software modules executed one or more computers having one or more processors. Alternatively, components of the system may be embodied as single or multiple software modules executed on fewer computers, or on a single computer. Each computer may be a general purpose computer, a server, a mainframe computer, or any combination of these components. Each computer may include at least one processor, a memory, and input/output (I/O) devices (not shown). Furthermore, each computer may communicate with one another via a communication link such as a direct communication link, a LAN, a WAN, the Internet, or other suitable connection. Software modules of the system may be stored on one or more tangible, non-transitory computer readable storage media.

Referring still to FIG. 1, Full Registry Snapshot (FRS) 60 for a TLD group such as (.com/.net) or (.cc/.tv/.jobs) is loaded into a database 30 in step S10. The database 30 is only used by the Searchable Whols system, and is not shared for other purposes. The database may be networked or in direct communication with a network router or server. FRS 60 contains all domain names and owner information associated with the domain names for the TLDs associated with the registry snapshot. Owner information associated with the domain names may data, such as include contact information, registrar information, nameserver information, and any other pertinent information associated with the domain name. The FRS 60 is then processed using an indexing scheme in step S20, and the indexing results are stored in text index 40 in step S30. After the FRS 60 has been received and indexed, subsequent Delta Transaction Sets (DTSs) 62 are received on a continuous basis in step S40, for near real-time updating of the database 30 and the text index 40 by repeating the indexing S20 and storing S30 steps for received DTSs 62. DTSs 62 may be received at intervals such as every fifteen seconds, or faster or slower depending on the required update frequency. The DTSs 62 contain any changes to the domain name data, including for example additions, deletions, or modifications to domain names and their owner information. Steps S40, S20, and S30 continue repeatedly when new DTSs 62 are received to keep the database 30 and text index 40 current. The updating of database 30 and text index 40 occurs substantially continuously in the background of other operations such as search request processing.

FIG. 1 also shows the basic flow of information. A search request is forwarded to the web server 20 in step S100. The web server 20 forwards the request to the text index 40 in step S200. The text index 40 forwards ranked matched search results to the web server in step S300. In step S400 the web server 20 queries the database 30 for owner information corresponding to the ranked matched search results. The corresponding owner information is retrieved from the database 30 in step S500, and received at the web server 20. The web server 20 forwards ranked search results with the corresponding owner information for each search result to the browser/web client 10 in step S600.

Figure 2:
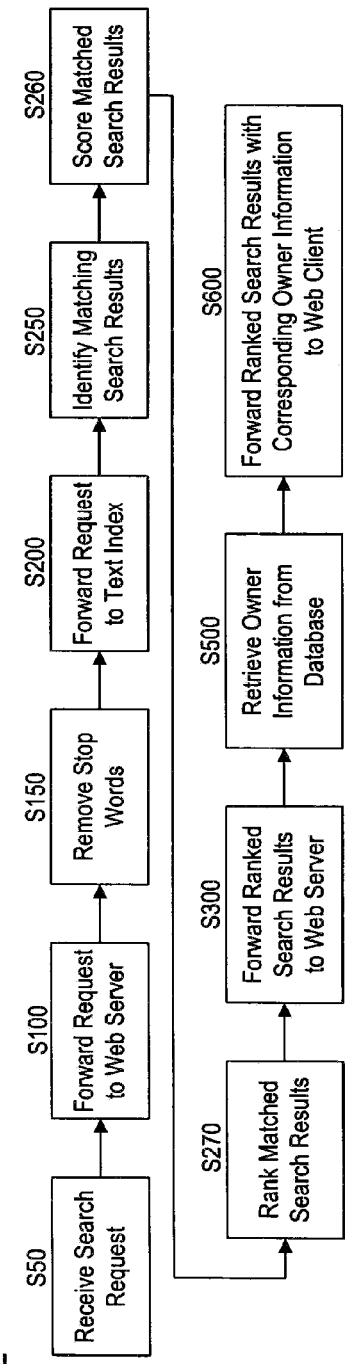
FIG. 2 is a flow diagram illustrating an elaboration of processes of certain embodiments of the system and method.

Referring now to FIG. 2, an elaboration of the information flow is shown. A search request is received by operation of the browser/web client in step S50. The search request is forwarded to web server in step S100. Stop words are removed from the search request in step S150. The web server then forwards the request to text index in step S200. The text index employs a search platform such as Elasticsearch (not shown), to identify matching search results between the search terms of the search request and the indexed data in step S250. Indexed data may include domain names, registrar information, contact information, or any other text searchable domain information that has been indexed and stored in the text index. Matched search results are scored based on relevancy and other factors in step S260, and ranked in descending score order in step S270, described in more detail below. The ranked matched search results, such as matched domain names, that make up the first page of search results (such as the first ten or twenty results) are forwarded to the web server in step S300. Then, the web server queries the database, and retrieves corresponding owner information corresponding to the first page of ranked search results in the order of their scores in step S500. Finally, the web server forwards the first page of ranked search results, such as ranked domain names, and corresponding owner information to the browser/web client in step S600 for display to the user. Afterward, the user may request the next page of results. Upon receiving a request for the next page of search results (step not shown), the text index forwards the next page of ranked matched search results to the web server and steps S300-S600 are repeated for the next page of matched search results. Search results thus may be presented in a paginated output for large result sets, without arbitrary limit.

Figure 3:
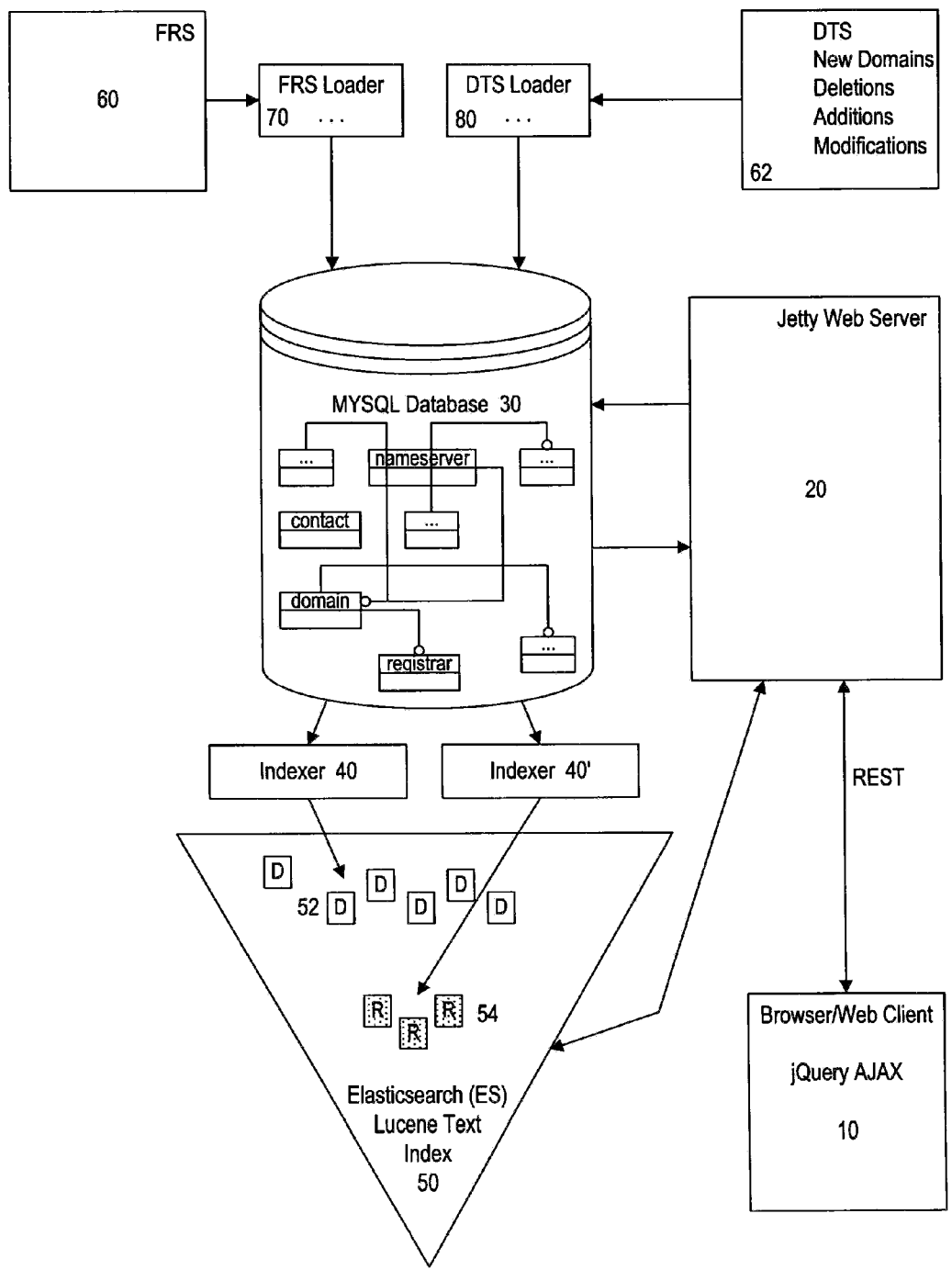
FIG. 3 is a diagram illustrating details of the system architecture that may be used with certain embodiments of the system and method.

FIG. 3 is a diagram illustrating details of the system architecture that may be used with certain embodiments of the system and method. An FRSLoader 70 or DTSLoader 80 load the FRS 60 or DTSs 62, respectively, into the database 30. The database 30 may be an RDBMS such as MySQL® database by Oracle®, or may be any other type of suitable network database. The database 30 comprises a Whols-type schema having domain name information stored with owner information organized into a hierarchy of fields, tables, or layers, including information and meta-data such as domains, nameservers, registrars, contact information, and IP addresses, along with their associated attributes and interrelationships. The system may comprise separate indexers 40 to index the FRS data and 40' to index the DTS data, which are then stored in the text index 50.

The text index 50 may employ an Elasticsearch search platform, which is an open source and Lucene™-based search platform optimized for large-scale multi-tenant systems. Alternatively, the text index 50 may utilize other search platforms that offer similar functionality. The text index 50 may store only text-searchable information such as domain name, contact names, registrar names, registrar contact information, domain contact information, and other associated names and addresses. Nameserver information and some registrar data is stored separately in the database. Alternatively, all information could be stored in text index. But, without substantial computing power, system performance would be compromised.

The use of database 30 for storing domain name owner information provides advantages over storing all data in the text index 50. In general, text indexes store flat documents with no hierarchical structure or layers. As a result, relationships between data entities are represented through denormalization, resulting in duplication and slower processing. For example, if only text index 40 is present, all nameserver data entries associated with domain names would have to be flattened and entered into the domain document of the text index. If nameserver data changes, the domain document would have to be updated, which results in extra time consuming steps when performed in a text index. In a Lucene™ index, an update of a document requires full deletion followed by a fresh insertion of the entire updated document. However, when the database 30 is also present, the domain name layer in the database contains only the domain name in the searchable field. Changes to nameserver data may be applied to the database without affecting other fields for the domain name. The result is a storage of information which can be updated faster by adding, deleting, or modifying portions of the entry for a domain name, rather than erasing the entire entry and reinserting a new one. It is to be noted that applying changes to a database tends to be much faster than indexing equivalent information to a text index.

Referring still to FIG. 3, in some embodiments the search request forwarded from browser/web client 10 to web server 20 may be a REST request such as RESTful API. Bidirectional communications between the browser/web client 10 and web server 20 may be facilitated by the jQuery AJAX framework. Web server 20 may be a Jetty type Java-based server.

Figure 4:
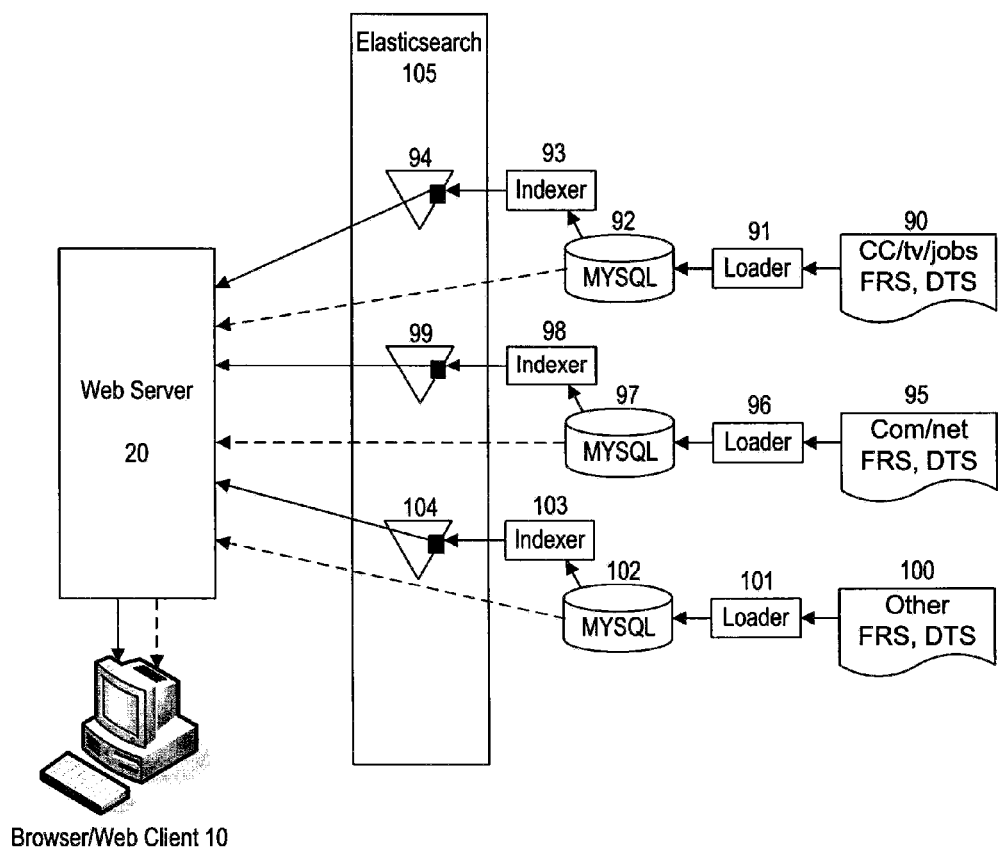
FIG. 4 is a diagram illustrating additional details of the system architecture and information flow that may be used with certain embodiments of the system and method.

FIG. 4 is a diagram illustrating additional details of the system architecture and information flow that may be used with certain embodiments of the system and method. The system may utilize multiple loaders, databases, indexers, and text indexes. For example: the cc/tv/jobs register FRS, DTS 90 may be loaded into a cc/tv/jobs database 92 via loader 91, indexed by a cc/tv/jobs indexer 93, and stored in a cc/tv/jobs text index 94; the com/net register FRS, DTS 95 may be loaded into com/net database 97 via loader 96, indexed by a com/net indexer 98, and stored in a com/net text index 99; and other top level domain registry FRS, DTS 100 may be loaded via another loader 101 into another database 102, and indexed by another indexer 103 for storage in another text index 104. The duplication of system components in this manner provides parallel simultaneous processing of separate registry data, and yields reduced processing times. Using this architecture, databases and text indexes may be updated faster.

When multiple databases 92, 97, and 102, and text indexes 94, 99, and 104 are employed for different registries, the web server 20 receives matched search results from each text index 94, 99, and 104 via Elasticsearch 105, and the matched search results indicate the top level domain associated with each result. Utilizing the indication, the web server 20 then queries the appropriate database 92, 97, or 102, to retrieve owner information as indicated by dotted lines.

Graphic User Interface

FIGS. 5A and 5B illustrate an example of the graphic user interface (GUI) 500 of certain embodiments of the system and method. GUI 500 comprises a search query entry box 510 for entering text. A TLD selection button 512 allows users to enter a search preference and modify their search query to search a single TLD or all TLDs simultaneously. Although not shown, other embodiments may also include options for the user to select a subset of multiple TLDs of their choice. Region 514 of the GUI 500 contains toggle buttons for entering an additional search preference by selecting the type of search to be performed, such as a domain name search, registrar search, contacts search, or nameserver search. The system and methods support full, partial, and Boolean full-text searches for domain data across all existing and new generic TLDs, such as .com, .net, .gov, .edu, .jobs, .tv, .org, etc. In certain embodiments, a text search will seek exact matches (e.g. "Internet" matches Internet com, Internet.net, Internetcc, etc., while "Internet.com" matches just Internet com). Furthermore, certain embodiments could seek arbitrary partial matches (e.g. "sign" matches sign.com, sign.net, vsign-.com, signk.com, etc.) rather than just exact or prefix matches. Additionally, certain embodiments could seek Boolean combinations of exact and partial matches (e.g. "fast AND Internet" matches fastinternetcom. The system may also support IDN Unicode partial, full, and Boolean searches.

GUI 500 may allow users to perform a grouping search "brand search" (feature not shown in figures). A grouping search would allow users to search a term across a logial grouping of TLDs. For example a "core" grouping may be pre-programmed that includes .com, .net, and .edu TLDs. When the user selects the "core" group search from a link, drop-down list, or check box, the search term would be searched across the TLDs associated with the group. Likewise, other groupings may be pre-programmed for searches such as groupings to search for particular brands or types of companies. Once a group is selected for searching, the associated TLDs would automatically be searched. Search results would then include the TLDs in the chosen group.

Referring still to FIGS. 5A and 5B, a majority of the GUI 500 is occupied by the ranked search results 520. Large search results without arbitrary limit are paginated, and the user may flip between pages of results by selecting page numbers 530. Each search result may include owner information 540 relevant to the type of search performed, such as a domain name with owner information about the nameserver and registrar when a domain search is conducted. Region 550 provides clickable links which the user may select to filter search results, and display search results from selected TLDs. Alternatively, clickable links in region 550 may be programmed to initiate a new search limited to the TLD specified by the selected TLD link, or in all TLDs when the "Searchable WhoIs" link is selected. In some embodiments, users may login to an account with the Searchable WhoIs utility using the account login portion 560, to enable additional features and search preferences, as will be discussed below.

In some embodiments, the GUI 500 may also provide a listing of domain name suggestions 570 that are available for registration based on the search terms and selected TLDs. Certain embodiments may also allow a user to limit searches to a particular location or geographical region. Location indicator 580 may display the location of the logged-in user such as country, region, state, zipcode, etc., and the search results may be limited to that location either automatically, or by user input of a search preference such as selecting the location indicator 580. Search results may be limited to a location by displaying only search results with a registrar, nameserver, or contact in the same geographical location or region. Location may be further specified by the user by entering a certain radius of miles or kilometers to search outside of the entered zipcode, address, etc. Alternatively, in some embodiments users may limit searches without logging in-to an account, and by using location indicator 580 by entering a search preference such as the desired search location, or a radius around a location.

Suffix-Based Indexing

Figure 6A:
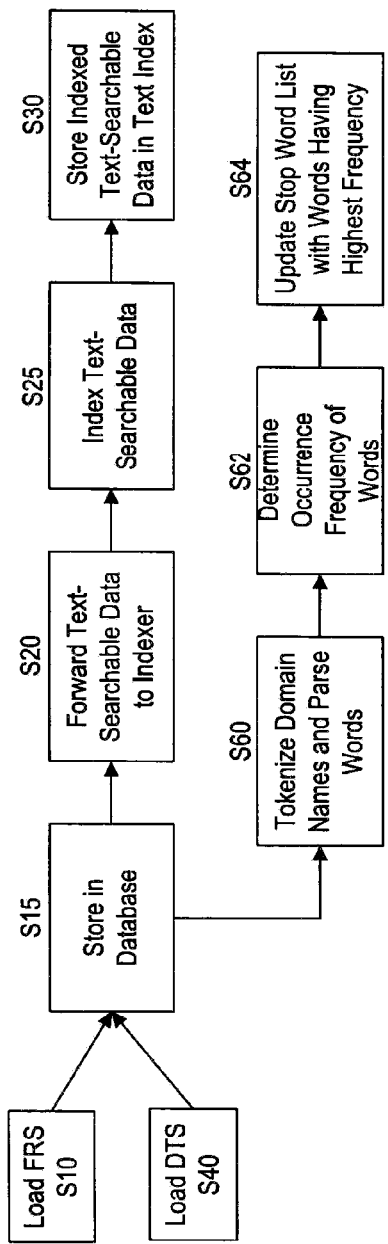
FIG. 6A is a flow diagram illustrating text index and stop word list update techniques that may be used with certain embodiments of the system and method.

FIG. 6A is a flow diagram illustrating an indexing technique that may be used with certain embodiments of the system and method. Domain names and owner information are received via loading of FRS or DTSs loaded in steps S10 and S40, respectively. All received data is stored in the database in step S15. Text-searchable data including the domain names and some owner information is forwarded to the indexer in step S20. Then, in step S25 all suffixes having a predetermined minimum suffix length of the text-searchable data are indexed, and stored in one or more fields associated with the domain name in the text index in step S30. The predetermined minimum suffix length is measured by number of characters. It may be preset and fixed, or may be calculated dynamically according to a desired ratio of minimum suffix length to total word length.

Figure 6B:
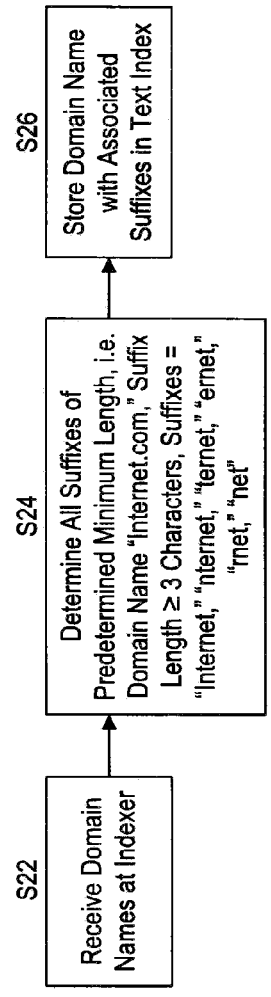
FIG. 6B is a flow diagram illustrating indexing techniques that may be used with certain embodiments of the system and method.

FIG. 6B shows an example of the suffix-based indexing technique. After receiving domain names and other text-searchable data at the indexer in step S22, suffixes are indexed in step S24, and the indexed information is stored in the text index in step S26. For example, as shown in step S24, when the domain name to be indexed is "Internet.com" and the predetermined minimum suffix length is three characters, the determined suffixes include "Internet," "nternet," "ternet," "ernet," "met," and "net." The suffix-based indexing scheme increases system efficiency, because fewer terms are stored for each domain name, and there is less data in the text index that must be searched, compared to other known indexing methods. One such known method is as n-gram indexing. In n-gram indexing (not shown in the figures), all permutations of the domain name having n characters (such as three or more characters) are indexed and stored. Using n-gram indexing, "Internet.com" would be indexed into "Internet," "Interne," "nternet," "Intern," "nterne," "ternet," "Inter," "ntern," "terne," "ernet," "Inte," "nter," "tern," "erne," "met,"

"Int," "nte," "ter," "ern," "me," and "net." The additional terms that must be indexed would result in longer indexing and search times.

Stop Word Removal

Search inquiries that include very common keywords like "the" in isolation or in disjunction can match a huge number of domain names, slow down the search, and yield inaccurate results. Traditionally, in text searching, common words that are not very meaningful from a search standpoint are filtered out and are not searched. These common words are "stop words." By omitting stop words from search requests, more accurate and focused search results can be obtained.

Referring again to FIG. 6A, a list of identified stop words is updated periodically. To update the stop list, first all domain names (and other text-searchable information) contained in the databases are tokenized and parsed into separate words using language recognition in step S60. The tokenization and parsing may be performed within the database, or by a separate software module on the same or separate computer. Although tokenization as previously discussed can be time consuming and computation-intensive, tokenization for stop-word identification would not need to be performed nearly as frequently as would tokenization for indexing. After tokenization, in step S62, the tokenized words are analyzed to determine the occurrence frequency of every word. The occurrence frequencies are analyzed to identify the words having the most frequent occurrences. A predetermined number of words having the highest occurrence frequencies are identified as "stop words," and the stop word list is updated accordingly in step S64. To accomplish steps S62 and S64, a frequency table, such as Table 1 below, may be populated with the words and their frequencies to identify the most common words that are present across all TLD registries. Alternatively, stop word lists may be generated for individual TLD registries.

The identified stop words may be removed from subsequent search queries, or used to warn a user of potentially overbroad or massive search results. Removal of the stop words may occur at the browser/web client, the web server, or the text index, or by any other intermediary component that receives and forwards search requests. Table 1 is an example of a frequency table sorted in order of the top twenty five most frequent tokenized terms in domain names.

TABLE 1

Example of Top 25 Most Frequent Domain Name Terms

| the | 2354767 |
|---|---|
| a | 2314310 |
| i | 1506689 |
| and | 1284003 |
| in | 1278790 |
| my | 1076007 |
| of | 935641 |
| online | 882478 |
| to | 856279 |
| s | 791816 |
| for | 726477 |
| e | 683566 |
| on | 616769 |
| is | 581864 |
| home | 579934 |
| group | 496691 |
| it | 479380 |
| de | 418254 |
| your | 410140 |
| design | 397388 |
| web | 378313 |
| as | 374226 |
| inc | 370323 |

TABLE 1-continued

Example of Top 25 Most Frequent Domain Name Terms

| shop | 365796 |
|---|---|
| free | 365542 |

Alternatively, instead of identifying and removing stop words an embodiment which may provide marginally faster yet less accurate results, involves terminating the search after a predetermined amount of time. The search results obtained prior to termination would then be ranked and displayed to the user.

Custom Scoring

In some embodiments, search results may be scored using a custom scorer that considers one or more factors. The custom scorer may consider the relevancy of the search result to the search request terms. When considering relevancy, the scorer computes scores by similarity, with closer matches being scored higher. This could be implemented using a modified form of Jaccard similarity. For example, the fraction of search term "Internet" matched by result ter is 3/8 (three characters matched out of eight characters in the search term). If more than one domain name matches the full search term, the match having fewer extra characters gets a higher score, because 1/(total characters) is added to the score. For example, a search for "tom*" matches both search results tom and tomtom in full, and both results have an initial score of 3/3, or 1. However tom is assigned an overall score of 1+1/3 (1+1/(3 characters in search result torn), while tomtom is assigned a score of 1+1/6 (1+1/(6 characters in tomtom). Therefore, the search result tom has a higher overall relevancy score. Each search result may be scored in this manner, followed by ranking of the search results in order of score from highest to lowest.

As previously mentioned, in certain embodiments the custom scorer may consider factors in addition to relevancy. As one of the additional factors, the custom scorer may consider the TLD of each search result, and boost the score of search results included in a certain TLD. This may be accomplished by assigning one or more TLDs different score values. Score values may then be combined with the relevancy score for each domain name by addition or multiplication. The score values may be predetermined and preprogrammed in the system, and can be changed over time by a system administrator. Alternatively, TLD score values may be selectable by the user by input of a search preference by ranking the TLDs in order of preference on the browser/web interface 60. For example, a user may prefer to rank .com search results higher than .net search results. In this scenario, .com would be assigned a greater score value than .net. A search for "Internet" would show search result Internetcom in a higher position than search result Internetnet, even though both domain names would have the same relevancy score.

EXAMPLES

FIGS. 7A-7M show examples of certain features of embodiments of the system and method. These examples are provided merely as illustrations, are not intended to limit the disclosed techniques in any way, and are not representative of exclusive embodiments.

Figure 7A:
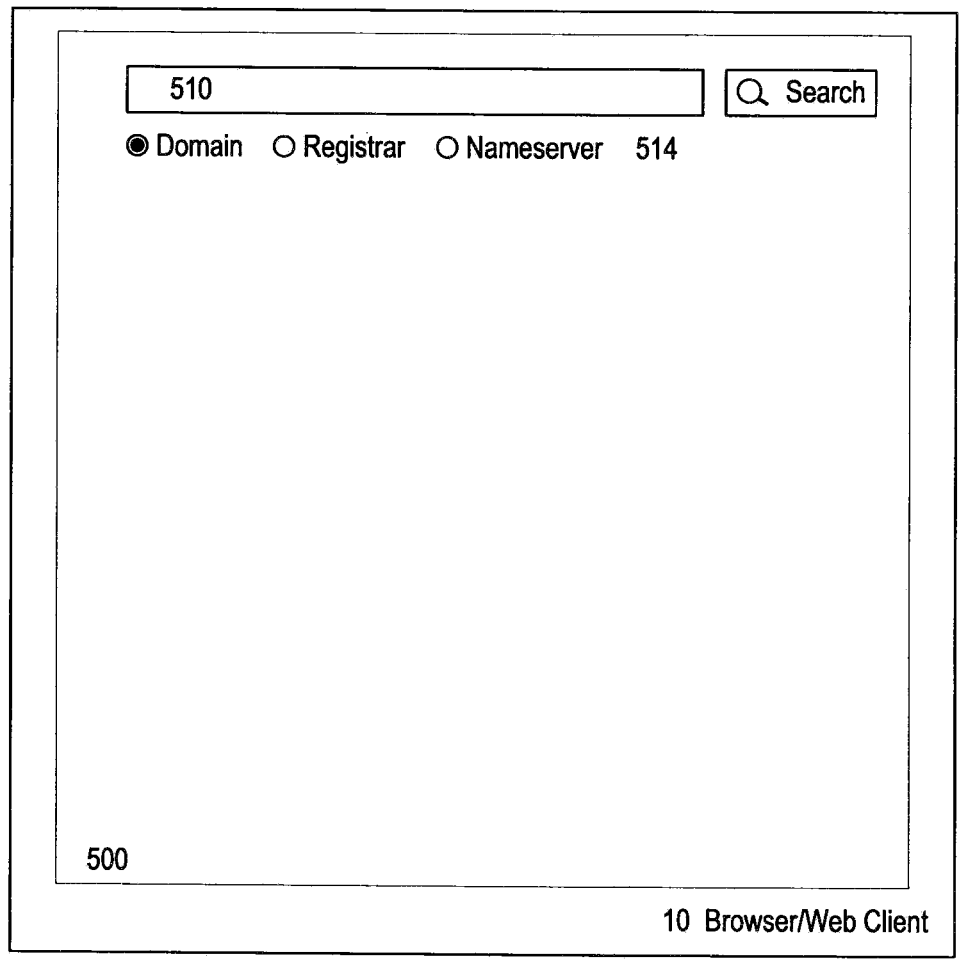

FIG. 7A shows an example of the GUI 500 in browser/web client 10 before any search is initiated by a user. In certain embodiments, GUI 500 contains a search query entry box 510 and region 514 containing toggle buttons for selecting the type of search. Preferably, the user interface is simple in design to provide a more enjoyable and productive user experience.

FIG. 7B shows an example of a domain search conducted for the term "verisign." The search term is entered in the search query entry box 510. The type of search is set to "Domain" via toggle buttons in region 514. The ranked search results 520 are displayed with the results having the highest relevancy score first. As shown, verisign.cc is shown before verisigninc.tv, because verisign.cc is a more exact match and thus has a higher relevancy score. Each search result may include owner information 540, including domain details such as a domain name, registrar name, nameservers for the domain, domain statuses, creation date, expiration date, and the date of the most recent update. Domain searches may be conducted by full or partial search using terms in the domain name, and with Boolean operators. Partial searches in this context mean the search terms may return matches containing the search term as only a portion of the match. For example, a search for "ver" may match verisign in a partial search, whereas a search for "ver" in a full search could only match ver.

FIG. 7C shows an example of a search performed for the term "google." In addition to results having the search term followed by additional characters such as googler.tv 710, search results can include domain names with characters before the search term such as igoogle.tv 720.

FIG. 7D shows an example of a search conducted for a term containing a non-ASCII character, such as a Latin or accented letter. For example, the term "TOMé.tv" is searched. Unlike previous WhoIs search utilities, the system and method of Searchable Web WhoIs has the ability to search non-ASCII characters in domain names.

FIG. 7E shows an example of different full, partial, and arbitrary search results returned for a search conducted for "tom." Exact matches are displayed first in order, followed by matches with lower relevancy. For example, tomtom.cc 730 contains the term "tom," however the domain name is assigned a lower relevancy score than tom.cc 740 because "tom" is repeated twice in tomtom.cc, whereas tom.cc contains an exact match of the search term. Arbitrary matches are then displayed, which have even lower relevancy scores because they contain characters which are not included in the search term, such as atom.tv 750.

FIG. 7F shows an example of features of certain embodiments of the system and method. Users who are logged in to an account with Searchable WhoIs may have the ability to view Personal Identifying Information (PII) available for the search results. The display of additional owner information associated with the domain name such as PII is also referred to as a "thick search result." In contrast, a "thin search result" displays the domain name, minimal owner information having little or no PII. Each search result contains a registrant information link 760, which when selected displays a registrant information window 770 containing registrant PII for that domain name. Registrant PII may include owner names, organization names, numbers, or other identifications, email addresses, mailing addresses, phone numbers, fax numbers, operational status, or any other personal identifying owner information associated with the registrant of the particular domain name. Registrant information link 760 may be selected by mouse click, mouse cursor rollover, input via touch screen, keyboard entry, or any other suitable selection method.

FIG. 7G shows a further example of features of certain embodiments of the system and method. Users who are logged in to an account with Searchable WhoIs may have the ability to view a contact information link 780, which when selected displays thick results including a contact information window 790 containing contact PII for that domain name. Contact PII may include members of the registrant organization such as billing or technical hostmasters, or administrators. Email addresses, physical addresses, telephone numbers, fax numbers, and operational status for the registrant organization members may also be shown. Contact information link 780 may be selected by mouse click, mouse cursor rollover, input via touch screen, keyboard entry, or any other suitable selection method.

FIG. 7H shows an example of a search conducted using Boolean operators. A domain name search is conducted for "network AND solutions," and contains the Boolean operator "AND" 800. The techniques include searching plurals and hyphenated combinations of the search terms, such as networkssolutions.cc 810 and network-solutions.tv 820, respectively.

FIG. 7I shows an example of a registrar search conducted for "network solutions" without any Boolean operators. Registrar searches may be conducted by web address or by registrar name, and partial searches may be supported. The type of search is set to "registrar" via toggle buttons in region 514. Search results 520 display exact and arbitrary matches of registrars. In certain embodiments, PII may be viewable for each of the registrars such as contact and WhoIs information.

FIG. 7J shows an example of a registrar search conducted by web address for "godaddy.com." The search returns an exact match, with accompanying owner information.

FIG. 7K shows an example of a registrar search by name for "enom." The search returns matches with owner information such as WhoIs information accessible by the WhoIs link 830. Additionally, contact information window 790 is accessible by selection of contact information link 780.

FIG. 7L shows an example of a nameserver search for "g4.nstld.com." Nameserver searches may be conducted by the full hostname of the nameserver or by IP address. Unlike domain and registrar searches, nameserver searches are conducted directly against the database, and the text index is not used. For this reason, only full searches may be conducted, and partial/arbitrary matches are not available. The search type is set to "nameserver" in region 514 containing toggle buttons for selecting the type of search.

FIG. 7M shows an example of a nameserver search by IP address for "192.41.162.32." The search is conducted against the database as a reverse-lookup type search. Exact/full matches for the IP address are returned.

The foregoing description of the techniques, along with associated embodiments, has been presented for purposes of illustration only. It is not exhaustive and does not limit the techniques to the precise form disclosed. Those skilled in the art will appreciate from the foregoing description that modifications and variations are possible in light of the above teachings or may be acquired from practicing the techniques. For example, the steps described need not be performed in the same sequence discussed or with the same degree of separation. Likewise, various steps may be omitted, repeated, or combined, as necessary, to achieve the same or similar objectives. Accordingly, the spirit and scope of the techniques described herein should be limited only by the following claims.

What is claimed is:

1. A computer-implemented WhoIs search method comprising steps of:

receiving and storing domain names and corresponding owner information associated with the domain names in one or more networked databases;

determining suffixes of the domain names that have at least a minimum length of characters:

indexing the suffixes of the domain names determined to have the minimum length of characters and suffixes of text-searchable portions of the corresponding owner information;

storing the suffixes in one or more text indexes;

receiving a search request and one or more search preferences from a user;

searching the one or more text indexes in response to the search request;

receiving search results including at least one matched domain name;

querying the one or more network databases for owner information corresponding to the at least one matched domain name; and displaying the at least one matched domain name and the corresponding owner information to the user.

2. The computer-implemented WhoIs search method of claim 1, wherein the one or more networked databases and one or more text indexes store domain names and owner information for multiple top level domains, and the received search request is processed with respect to all stored top level domains.

3. The computer-implemented WhoIs search method of claim 1, wherein the one or more networked databases and one or more text indexes store domain names and owner information with the domain names for multiple top level domains, and the received search request is processed with respect to one or more of the stored top level domains.

4. The computer-implemented WhoIs search method of claim 1, wherein the at least one search preference received from the user includes a selection of one or more top level domains.

5. The computer-implemented WhoIs search method of claim 1, wherein the minimum length of characters is three.

6. The computer-implemented WhoIs search method of claim 1, further comprising scoring the search results with relevancy scores based at least in part on relevancy of the matched search result to the search request, and wherein the search results are displayed in order of decreasing relevancy score.

7. The computer-implemented WhoIs search method of claim 6, further comprising boosting the relevancy score of search results included in at least one preferred top level domain, wherein the at least one preferred top level domain is predetermined or included in the at least one search preference received from by the user.

8. The computer-implemented WhoIs search method of claim 1, wherein the minimum length of characters for each domain name of the domain names is calculated based on a predetermined ratio and a total length of the domain name.

9. A WhoIs searching system comprising:

one or more networked databases that receives and stores domain names and corresponding owner information associated with the domain names;

one or more indexer modules that determines suffixes of the domain names having at least a minimum length of characters and indexes suffixes of the domain names determined to have the minimum length of characters and suffixes of text-searchable portions of the corresponding owner information;

one or more text indexes that receives and stores the suffixes indexed by the one or more indexer modules;

a web client module that receives a search request and one or more search preferences from a user;

a web server that forwards the search request to the one or more text indexes, receives search results from the one or more text indexes, queries the one or more databases for owner information corresponding to the search results, and forwards the search results with the corresponding owner information to the web client, wherein the web client displays the search results and the corresponding owner information, and wherein the modules are executed by one or more processors.

10. The WhoIs search system of claim 9, wherein the minimum length of characters is three.

11. The WhoIs search system of claim 9, wherein the minimum length of characters for each domain name of the domain names is calculated based on a predetermined ratio and a total length of the domain name.

12. A non-transitory computer readable storage medium having stored thereon instructions which when executed cause one or more computers to perform the WhoIs search method comprising steps of:

receiving and storing domain names and corresponding owner information associated with the domain names in one or more networked databases determining suffixes of the domain names that have at least a minimum length of characters;

indexing the suffixes of the domain names determined to have the minimum length of characters and suffixes of text-searchable portions of the corresponding owner information;

storing the suffixes in one or more text indexes;

receiving a search request and one or more search preferences from a user;

searching the one or more text indexes in response to the search request;

receiving search results including at least one matched domain name;

querying the one or more network databases for owner information corresponding to the at least one matched domain name; and displaying the at least one matched domain name and the corresponding owner information to the user.

13. The computer readable storage medium of claim 12, wherein the minimum length of characters is three.

14. The computer readable storage medium of claim 12, wherein the minimum length of characters for each domain name of the domain names is calculated based on a predetermined ratio and a total length of the domain name.

* * * * *